United States Patent
Minaguchi et al.

(10) Patent No.: US 7,382,604 B2
(45) Date of Patent: Jun. 3, 2008

(54) ELECTRONIC APPARATUS

(75) Inventors: Hiroyuki Minaguchi, Higashimatsuyama (JP); Yasuyuki Horii, Ome (JP); Masanori Sato, Ome (JP); Tomohiro Hamada, Hamura (JP); Hidemi Itakura, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 11/167,672

(22) Filed: Jun. 27, 2005

(65) Prior Publication Data

US 2006/0077630 A1 Apr. 13, 2006

(30) Foreign Application Priority Data

Sep. 30, 2004 (JP) ............................. 2004-286463

(51) Int. Cl.
*G06F 1/16* (2006.01)
(52) U.S. Cl. .................... 361/680; 345/173; 455/566
(58) Field of Classification Search ................ 345/175, 345/173, 418; 361/679–687, 724–727; 439/142; 455/566, 575.4
See application file for complete search history.

(56) References Cited

U.S. PATENT DOCUMENTS

| | | | |
|---|---|---|---|
| 4,864,523 A | 9/1989 | Sasaki | |
| 5,483,418 A | 1/1996 | Hosoi | |
| 5,689,400 A | 11/1997 | Ohgami et al. | |
| 5,805,861 A | 9/1998 | Gilbert et al. | |
| 5,808,860 A | 9/1998 | Ohgami et al. | |
| 5,808,861 A | 9/1998 | Nakajima et al. | |
| 6,125,040 A | 9/2000 | Nobuchi et al. | |
| 6,198,626 B1 | 3/2001 | Nakajima et al. | |
| 6,288,892 B1 | 9/2001 | Lanz et al. | |
| 6,394,300 B1 | 5/2002 | Bosy | |
| 6,661,650 B2 | 12/2003 | Nakajima et al. | |
| 2003/0011986 A1* | 1/2003 | Ariga | 361/687 |
| 2003/0142472 A1 | 7/2003 | Park | |
| 2005/0040972 A1 | 2/2005 | Hamada | |

FOREIGN PATENT DOCUMENTS

| | | |
|---|---|---|
| JP | 11-175186 | 7/1999 |
| JP | 2002-091614 | 3/2002 |
| JP | 2002-182784 | 6/2002 |
| JP | 2002-189530 | 7/2002 |
| JP | 02002237694 A * | 8/2002 |

* cited by examiner

Primary Examiner—Hung Van Duong
(74) Attorney, Agent, or Firm—Blakely, Sokoloff, Taylor & Zafman

(57) ABSTRACT

A portable computer as an example of an electronic apparatus has a main unit, and a cover member placed on the upper surface of the main unit. The main unit has a housing. A component mounting part is formed on the upper surface of the housing. The component mounting part is covered with the cover member. The cover member has a sliding-type first cover, and a fitting-type second cover. The first cover is placed on a first area of the component mounting part. The first cover has a lock portion, which is slid in the width direction of the housing, and engages with the housing. The second cover is placed on a second area of the component mounting part not covered with the first cover. The second cover is fit to the housing from the upper side of the component mounting part.

10 Claims, 7 Drawing Sheets

ELECTRONIC APPARATUS

CROSS-REFERENCE TO RELATED APPLICATIONS

This application is based upon and claims the benefit of priority of Japanese Patent Application No. 2004-286463, filed Sep. 30, 2004, the entire contents of which are incorporated herein by reference.

BACKGROUND

1. Field

The present invention relates to an electronic apparatus such as a portable computer having a cover member on the upper surface of a main unit.

2. Description of the Related Art

A main unit of an electronic apparatus such as a portable computer has a housing to contain a circuit board or the like. A keyboard is placed in the upper part of the housing. For example, as described in U.S. Pat. No. 6,661,650, a cover member may be placed in the upper part of a housing according to a type of a main unit. A cover member covers a component mounting part formed on the upper surface of the housing.

A horizontal sliding cover member may be used to make the cover member removable from a housing. A horizontal sliding cover member has a lock portion on the rear side of the cover member. The housing has a receiving portion at a position corresponding to the lock portion.

When mounting the horizontal sliding cover member on the housing, place the cover member on the component mounting part from the upper side of the housing, and slide the cover member in a horizontal direction (a width direction of the housing). Then, the lock portion of the cover member engages with the receiving portion of the housing, and the cover member is fixed to the housing.

In the structure for sliding a cover member placed on the component mounting part of the housing, like the above sliding cover member, it is necessary to secure a slide stroke of the cover member. Thus, it is necessary to make the length of the cover member shorter than the length of the component mounting part. But, in this structure, a clearance is generated between the housing and the end portion of the cover member.

The sliding structure is considered not to generate a clearance. In the sliding structure, one end of the component mounting part is opened in one side of the housing. When mounting the cover member, insert the cover member into the component mounting part through the opening. In this time, the end face of the cover member projects to the side surface of the housing through the opening, but when the cover member is moved to the mounting position, the end face coincides with the side surface of the housing.

However, in the above conventional sliding structure, one end of the component mounting part is opened in a side surface of the housing (one side of the housing). Thus, a joint between the side surface of the housing and the end face of the cover member is exposed to one side of the housing, spoiling the appearance. Further, the design is largely restricted.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be explained hereinafter based on the drawings applied to a portable computer.

Figure 1:
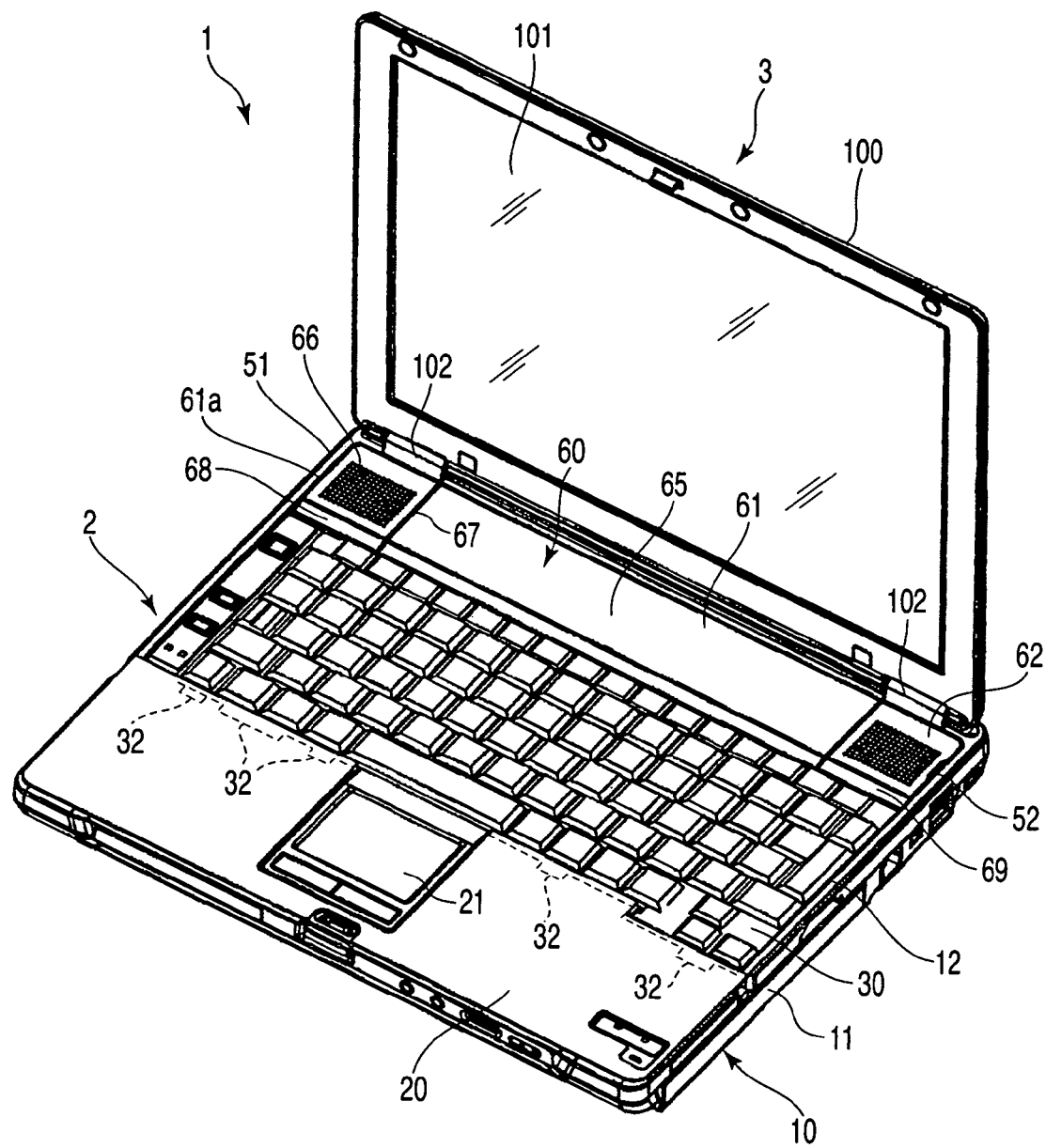
FIG. 1 is a perspective view of a portable computer according to an embodiment of the present invention.

FIG. 1 shows a portable computer 1 as an example of electronic apparatus. The portable computer 1 has a main unit 2 and a display unit 3.

Figure 4:
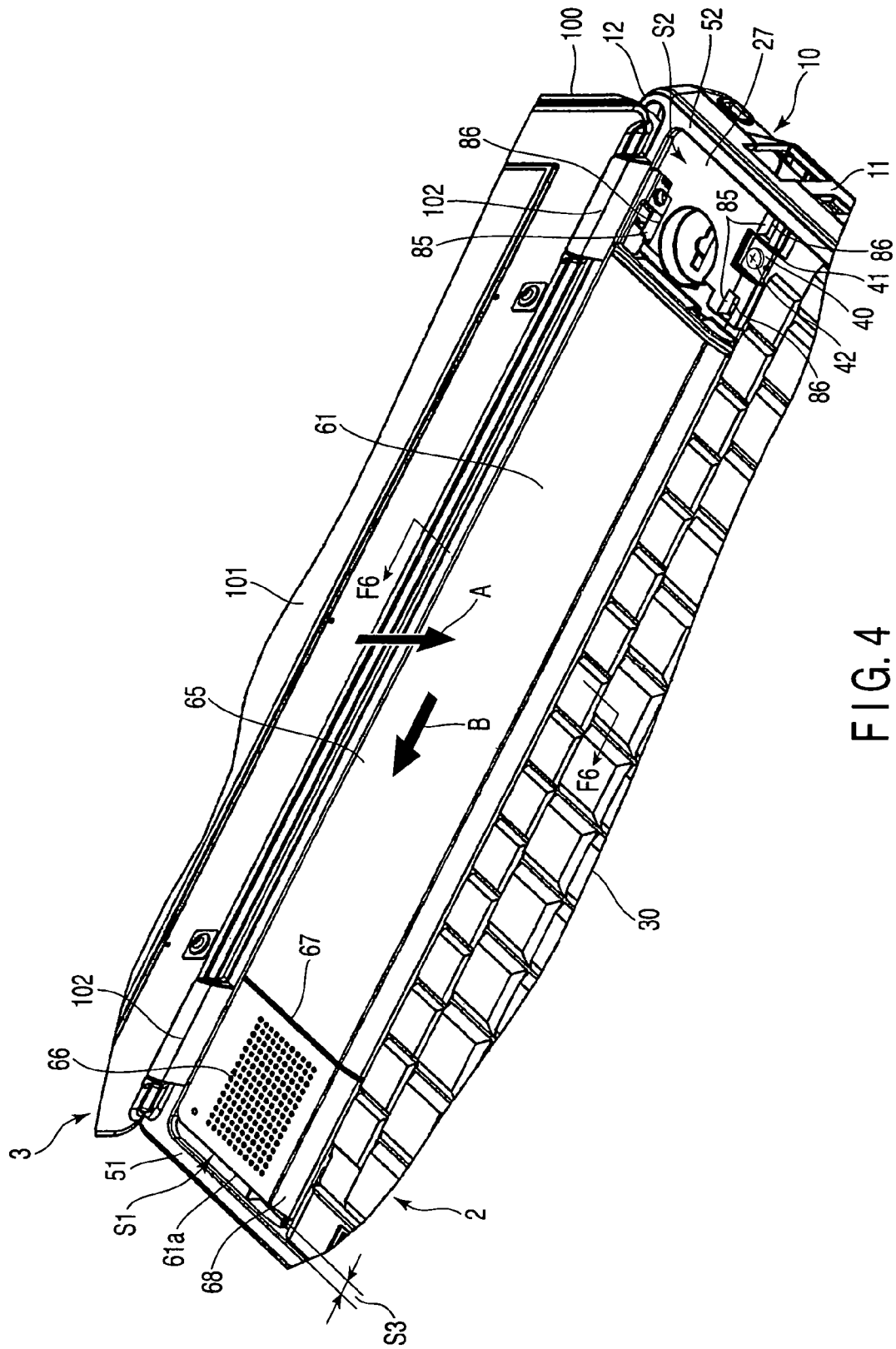
FIG. 4 is a perspective view of the portable computer shown in FIG. 1, with a first cover mounted on the main unit.

The main unit 2 has a flat box-like housing 10. As shown in FIGS. 1 and 4, the housing 10 consists of a lower housing 11 and an upper housing 12.

The lower housing 11 forms substantially the lower half of the housing 10. The upper housing forms substantially the upper half of the housing 10. The housing 10 contains a circuit board 13 (shown in FIG. 2). The circuit board 13 is mounted with electronic components for controlling the portable computer 1.

In the front part of the main unit 2, a palm rest portion 20 and an input unit 21 such as a touch pad are provided. The palm rest portion 20 is composed of a part of the upper housing 12. In the rear part of the main unit 2, a battery receptacle 23 is provided. The battery receptacle 23 stores a battery 22 (shown in FIG. 6) as a power supply.

Figure 2:
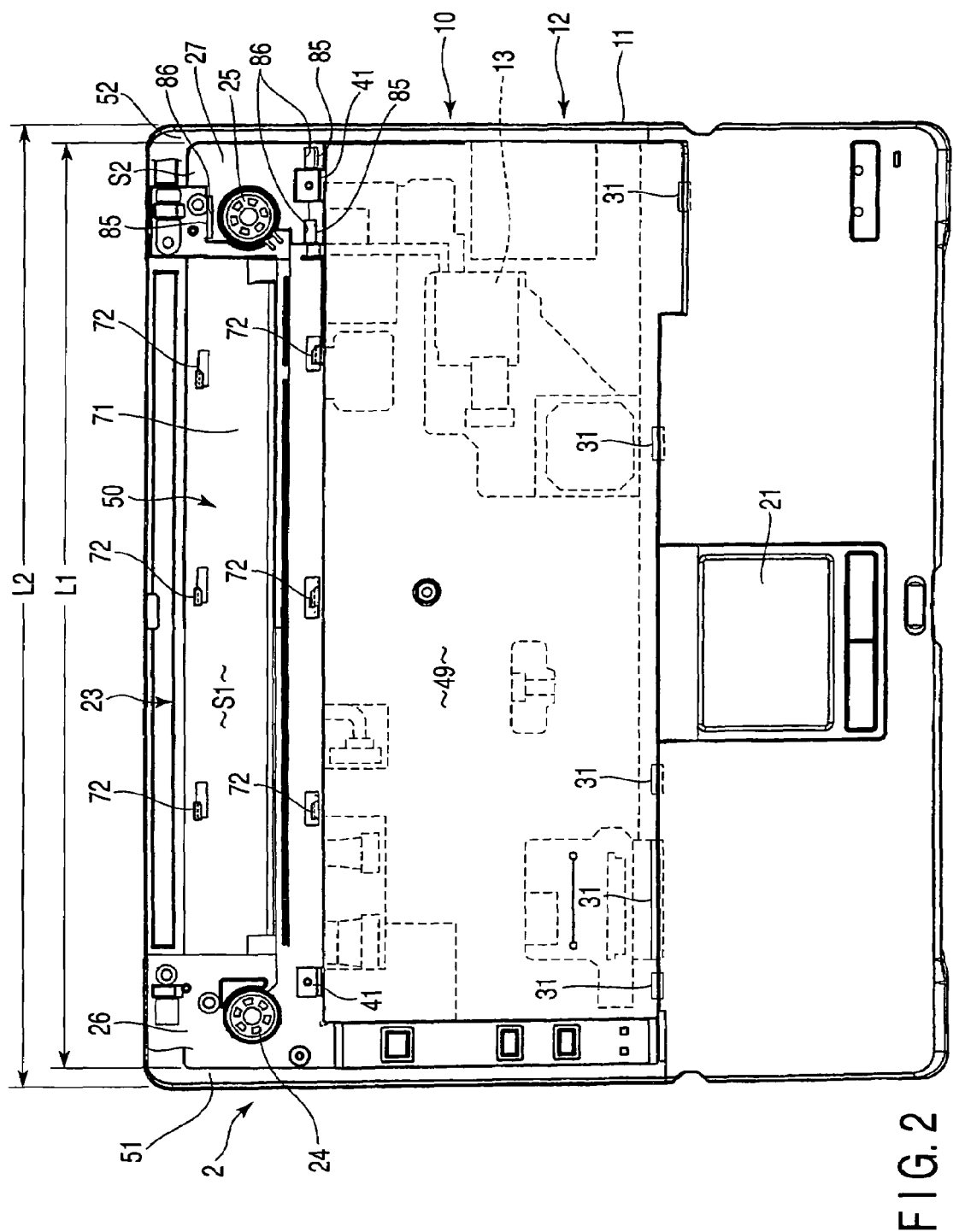
FIG. 2 is a plane view of the portable computer shown in FIG. 1, with a keyboard and a cover member removed from a main unit.

As shown in FIG. 2, the upper housing 12 is provided with a keyboard mounting part 49 and a component mounting part 50. The component mounting part 50 has spaces 26 and 27 (shown in FIG. 2). The spaces 26 and 27 contain electronic components such as speakers 24 and 25.

A keyboard 30 is mounted on the keyboard mounting part 49 provided on the upper surface of the main unit 2. As shown in FIG. 2, holes 31 are formed at several points of the upper housing 12. The holes 31 are formed in the front part of the keyboard mounting part 49. A projection 32 (shown in FIG. 1) is formed at the front end of the keyboard 30. By inserting the projection 32 into the hole 31, the front end of the keyboard 30 is fixed to the housing 10.

Figure 5:
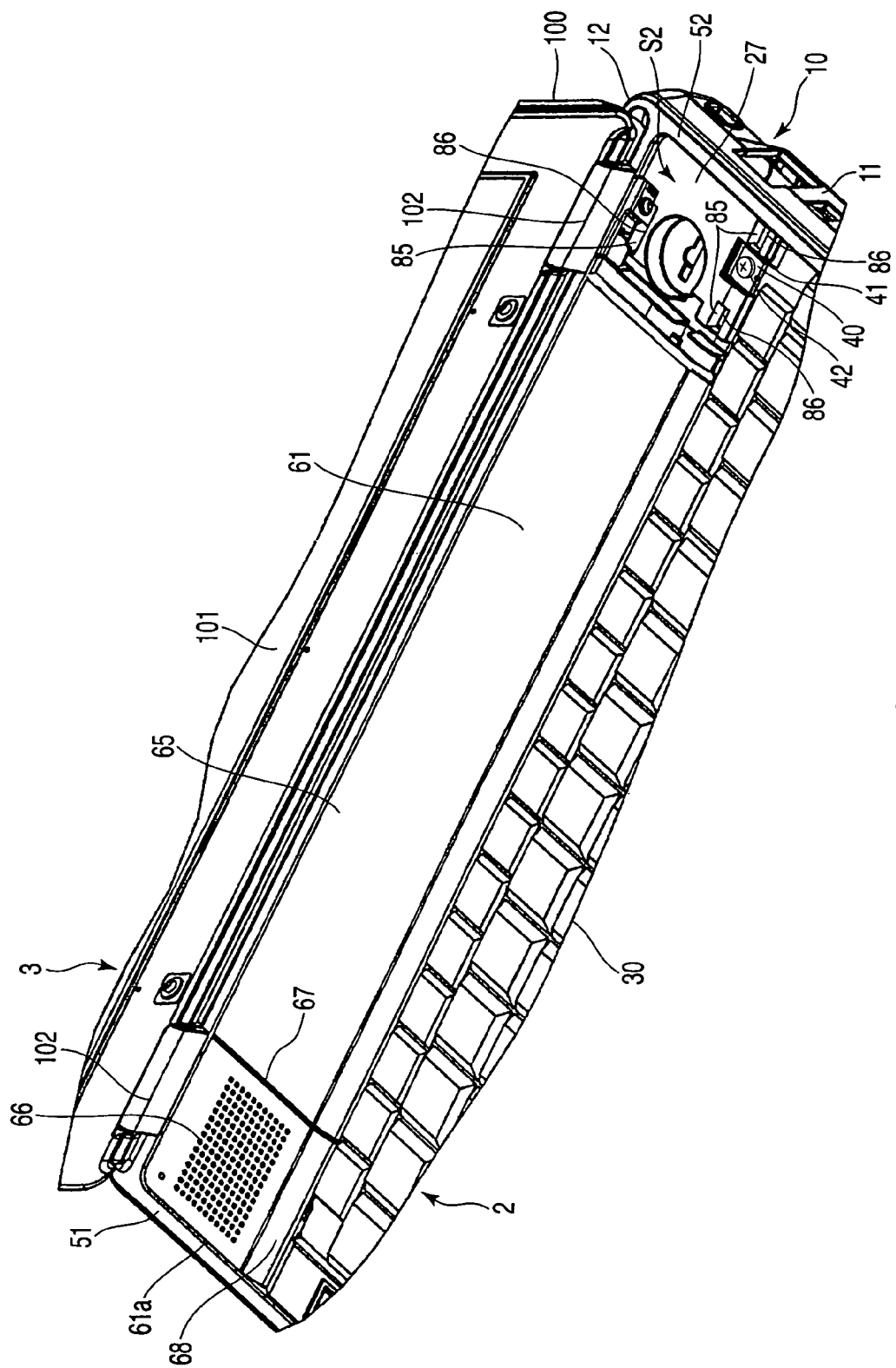
FIG. 5 is a perspective view of the first cover shown in FIG. 4 in the moved state.

At the rear end of the keyboard 30, a pair of fitting portions 40 is formed (only one is shown in FIG. 4). In the upper housing 12, a keyboard holding part 41 is formed at a position corresponding to the fitting portion 40. The rear end of the keyboard 30 is fixed to the keyboard holding part 41 with a fixing member 42 such as a screw member (only one is shown in FIGS. 4 and 5).

In the state that the keyboard 30 placed in the housing 10, a component mounting part 50 mentioned in the present invention is formed on the upper surface of the rear part of the main unit 2. As shown in FIG. 2, the length L1 of the component mounting part 50 is shorter than the width L2 of the housing 10. Wall portions 51 and 52 as a part of the housing 10 are formed at left and right ends of the component mounting part 50.

Figure 3:
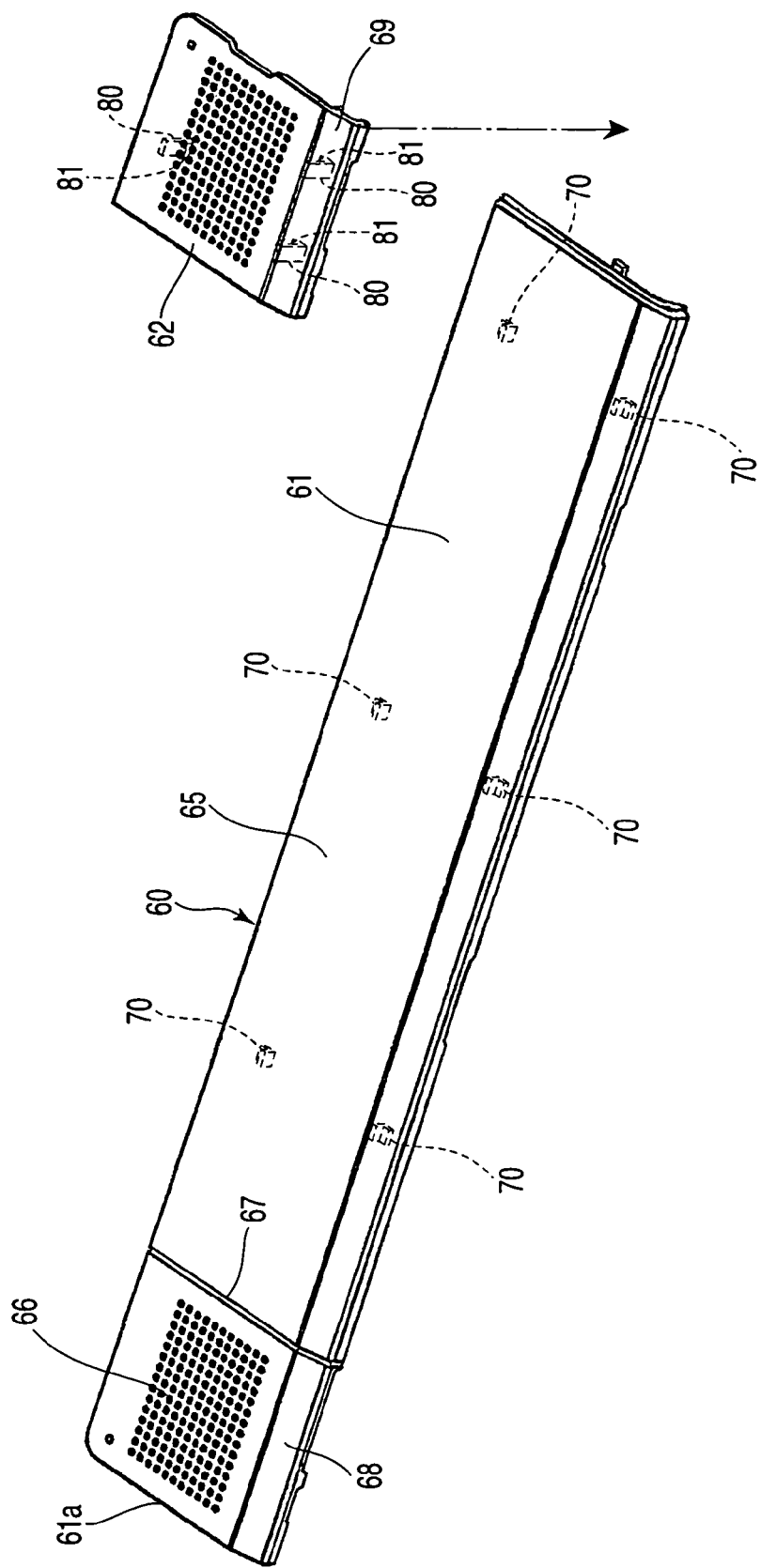
FIG. 3 is a perspective view of a cover member of the portable computer shown in FIG. 1.

A cover member 60 to cover the component mounting part 50 is placed on the upper surface of the rear part of the main unit 2. As shown in FIG. 3, the cover member 60 consists of a first cover 61 and a second cover 62. In this specification, an area of the component mounting part 50 covered by the first cover 61 is called a first area S1. An area of the component mounting part 50 covered by the second cover 62 is called a second area S2. Namely, the cover member 60 includes a sliding-type first cover 61 to cover the first area S1, and a fitting-type second cover 62 to cover the second area S2.

The battery receptacle 23 is formed in the lower part of the first area S1. The battery 22 is inserted into the battery receptacle 23 through the opening formed at the rear of the housing 10. The upper part of the battery receptacle 23 is covered with the first cover 61. The space 27 is formed in the second area S2. The space 27 contains relatively small electronic components except a battery (e.g., one speaker 25 shown in FIG. 2).

The first and second covers 61 and 62 are made of synthetic resin. The first cover 61 includes a main part 65 and a sound exit 66. The main part 65 is rectangular along the width direction of the main unit 2. The main part 65 has a length to cover the battery receptacle 23. The sound exit 66 is formed at one end side of the main part 65 (opposite to the second cover 62).

The sound exit 66 is formed at the position symmetrical to the second cover 62. The sound exit 66 has a shape symmetrical to the second cover 62. The sound exit 66 covers the other speaker 24. A groove 67 is formed at the boundary between the main part 65 and sound exit 66, dividing the main part 65 and sound exit 66. The first cover 61 has a part 68 to cover one of the pair of keyboard holders 41.

The second cover 62 is smaller than the first cover 61, and has a shape corresponding to the sound exit 66 of the first cover 61. Namely, the second cover 62 constitutes a sound exit to cover the other speaker 25. The second cover 62 has a part 69 to cover the other keyboard holder 41.

Several slide lock portions 70 are formed on the rear side of the first cover 61. The lock portion 70 is provided 3 each at the front and rear parts of the first cover 61, for example. As shown in FIG. 2, several receiving portions 72 are formed on the bottom wall 71 of the upper housing 12. The receiving portion 72 is formed at a position corresponding to the lock portion 70. The receiving portion 72 has a shape to engage with the lock portion 70 when the first cover 61 is moved in the horizontal direction, or in the width direction of the housing 10.

Several hook-shaped lock pieces 80 (shown in FIG. 3) are formed on the rear side of the second cover 62. A stopper 81 is formed at the tip of the lock piece 80. For example, two lock pieces 80 are formed in the front part of the second cover 62, and one lock piece 80 is formed in the rear part of the second cover 62.

As shown in FIG. 2, a receiving hole 85 is formed in the upper housing 12. The receiving hole 85 is formed at the position corresponding to the lock piece 80. In the receiving hole 85, a receiving piece 86 is formed to engage with the lock piece 80. The receiving piece 86 has the shape to engage with the stopper 81 of the lock piece 80, when the second cover 62 is fit from the upper side of the second area S2.

The display unit 3 has a flat box-like case 100, a liquid crystal display panel 101 provided in the case 100, and a backlight (not shown) contained in the case 100. A hinge 102 is provided at the rear end side of the main unit 2. The display unit 3 is attached to the main unit 2 with the hinge 102 movably up and down to open and close relative to the main unit.

Namely, the display unit 3 is movable to closed and opened positions relative to the main unit 2. When the display unit 3 is closed, the display unit 3 is overlaid on the main unit 2 with the image display surface of the liquid crystal display panel 101 faced down. The closed display unit 3 covers the upper surface of the main unit 2 from the upper side.

Hereinafter, an explanation will be give on the function of the cover member 60 of the portable computer 1 of this embodiment.

When attaching the first cover 61 to the housing 10, place the first cover 61 in the first area S1 of the component mounting part 50 of the housing 10, as indicated by the arrow A in FIG. 4. In this time, a gap S3 is generated between one end 61a of the first cover 61 and the wall portion 51 of the housing 10. The gap S3 corresponds to a sliding stroke of the first cover 61.

Slide the first cover 61 toward the gap S3 in the horizontal direction (the direction indicated by the arrow B in FIG. 4). One end 61a of the first cover 61 contacts the wall portion 51, as shown in FIG. 5. The gap S3 (shown in FIG. 4) is eliminated. By this sliding operation, the lock portion 70 of the first cover 61 engages with the receiving portion 72 of the housing 10. At the same time, the first cover 61 covers the first area S1, and is fixed to the housing 10 in this state.

Figure 7:
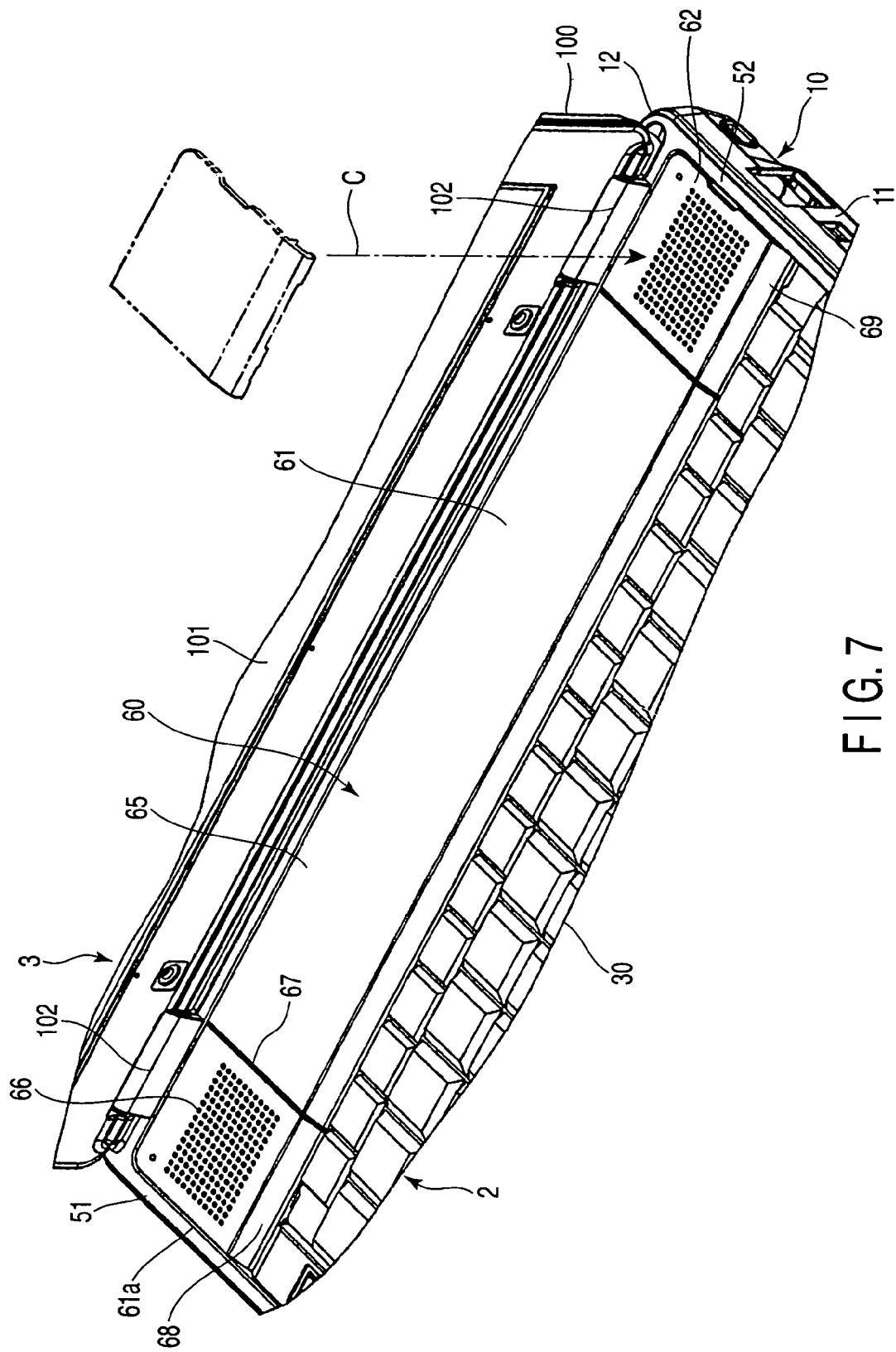
FIG. 7 is a perspective view of the portable computer shown in FIG. 1, with a second cover mounted on the main unit.

Next, fit the second cover 62 in the second area S2 of the component mounting part 50 from the upper side of the housing 10, as indicated by the arrow C in FIG. 7. The hook-shaped lock piece 80 of the second cover 62 is inserted into the receiving hole 85 of the housing 10. During the insertion, the lock piece 80 is elastically deformed and rides over the receiving piece 86, and the stopper 81 of the lock piece 80 hangs in the receiving piece 86. The second cover 62 covers the second area S2, and is fixed to the housing 10 in this state. The cover member 60 is placed between the wall portions 51 and 52 of the housing 10.

As described above, the cover member 60 consists of the first and second covers 61 and 62. With this configuration, when the cover member 60 is fixed to the component mounting part 50 of the housing 10, a joint with the cover member 60 is not generated on the side surface of the housing 10. This provides good appearance and large design flexibility for the housing 10. At the end portion of the first cover 61, the sound exit 66 having the same shape as the second cover 62 as a sound exit is formed. The sound exit 66 is divided from the main part 65 by the groove 67. Thus, the cover member 60 can be designed to be symmetrical with good balance.

Figure 6:
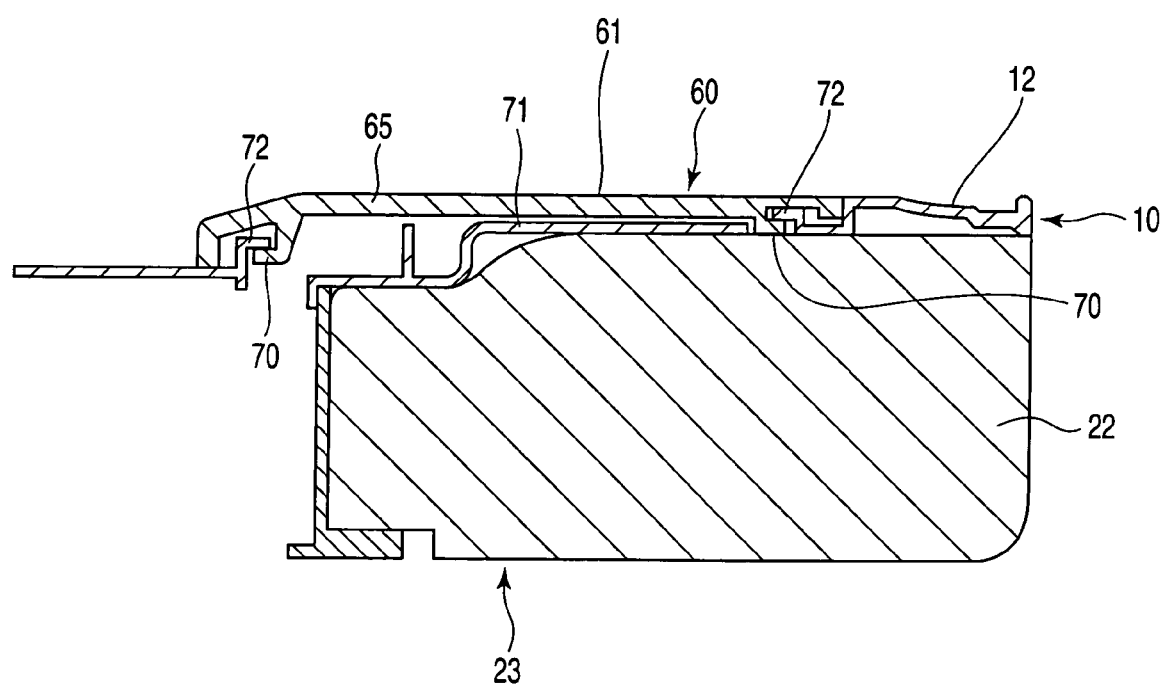
FIG. 6 is a sectional view of a part of the main unit taken along lines F6-F6 in FIG. 4.

As shown in FIG. 6, the first cover 61 covers the battery receptacle 23. In the battery receptacle 23, as the battery 22 has a certain largeness, the bottom wall 71 of the upper housing 12 is very close to the first cover 61. Thus, the distance from the first cover 61 to the bottom wall 71 of the upper housing 12 is much reduced. However, as the lock portion 70 provided in the first cover 61 is of a sliding type fixed by moving in the horizontal direction, a downward projection is relatively small. Thus, even if the distance from the first cover 61 to the bottom wall 71 of the upper housing 12 is short, it is possible to provide the lock portion 70 and receiving portion 72.

On the other hand, the second cover 62 covers the space 27 containing small electronic components except a battery. Thus, the distance from the second cover 62 to the bottom wall 71 of the upper housing 12 can be taken larger than the battery receptacle 23. This permits using a hook-shaped lock piece 80 having a relatively large downward projection.

In the above-mentioned embodiment, the hook-shaped lock piece 70 is adopted as a means of fixing the second cover 62 to the housing 10. Instead of using such a lock piece 70, it is permitted to use a screw member inserted into the hole of the housing from the lower side of the housing 10, to fix the second cover 62 to the housing 10. It is also permitted to use a fitting type third cover different from the first cover 61, to configure the end portion of the first cover 61, or a part corresponding to the sound exit 66, for example. It is also permitted to fix the third cover to the housing 10 with the same lock piece 70 as that used to fix the second cover 62.

In the above embodiment, the cover member to cover the speaker provided in the component mounting part has been explained. Instead of the speaker, components such as an LED board, a power switch and a switchboard may be mounted in the component mounting part. In this case, it is possible to make an opening in the cover member to expose a lens to transmit light from an LED or a switch.

The electronic apparatus according to the present invention is not limited to a portable computer. Any electronic apparatus is applicable, as long as it has a main unit and a cover member to cover an opening in the upper part of the main unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a housing that comprises a component mounting part including a first area and a second area;
    a keyboard including a keyboard fitting portion and being mounted on upper surface of the housing; and
    a cover member covering the component mounting part and the keyboard fitting portion, the cover member including
        a first cover mounted on the component mounting part, engaged to the housing by sliding and covering the first area; and
        a second cover fitting to the housing and covering the second area.

2. The electronic apparatus according to claim 1, wherein the cover member extends over a keyboard holding part and the keyboard fitting portion that are used to secure the keyboard to the upper housing.

3. An electronic apparatus comprising:
    a housing that comprises a battery receptacle and a component mounting part including a first area and a second area; and
    a cover member to cover the battery receptacle and the component mounting part the cover member including
        a first cover positioned over the component mounting part, engaged to the housing by sliding and covering the first area, the first cover includes a lock portion which engages to the housing when the first cover is slid, and
        a second cover fitting to the housing and covering the second area, the second cover includes a lock portion which engages with a receiving portion of the housing in a state where the second cover fit into the second area of the component mounting part.

4. An electronic apparatus comprises;
    a housing that comprises a speaker and component mounting part including a first area and a second area; and
    a cover member to cover the speaker and the component mounting part the cover member including
        a sound exit portion to cover the speaker,
        a first a cover positioned over the component mounting part engaged to the housing by sliding and covering the first area, the first cover includes a lock portion which engages to the housing when the first cover is slid, and
        a second cover fitting to the housing and covering the second area, the second cover includes a lock portion which engages with a receiving portion of housing when the second cover is fit into the second area of the component mounting part.

5. The electronic apparatus according to claim 4, wherein the first cover has a sound exit part which is a part of the first cover and formed to have a shape corresponding to the second cover at a position symmetrical to the second cover.

6. The electronic apparatus according to claim 5, wherein a pair of speakers is provided; and the sound exit part of the first cover and a sound exit part of the second cover are at a position corresponding to the pair of speakers.

7. An electronic apparatus comprising:
    a housing including a keyboard mounting part, and a component mounting part including a first area and a second area;
    a keyboard mounted in the keyboard mounting part;
    a first cover mounted on the component mounting part, engaged to the housing by sliding and covering the first area; and
    a second cover fitting to the housing, and covering the second area.

8. The electronic apparatus according to claim 7, wherein the keyboard has a fitting part at an edge, the first and second covers cover the fitting part of the keyboard.

9. The electronic apparatus according to claim 8, further comprising a pair of the speakers mounted in the component mounting part; and the first and second covers have a sound exit part at a position corresponding to the pair of speakers.

10. The electronic apparatus according to claim 9, wherein the fitting part is fixed to the first and second areas with a screw.

* * * * *